(12) United States Patent
Shoshany

(10) Patent No.: US 7,541,503 B2
(45) Date of Patent: Jun. 2, 2009

(54) FORMATION OF SUBSTANCES BY MECHANICAL BREAKING OF CARBON-CARBON CHAINS MOLECULES

(75) Inventor: Haggai Shoshany, Kfar Tavor (IL)

(73) Assignee: H.A. Industrial Technologies Ltd, Caesarea (IL)

( * ) Notice: Subject to any disclaimer, the term of this patent is extended or adjusted under 35 U.S.C. 154(b) by 231 days.

(21) Appl. No.: 11/567,263

(22) Filed: Dec. 6, 2006

(65) Prior Publication Data

US 2008/0167507 A1  Jul. 10, 2008

(51) Int. Cl.
*C10G 1/10* (2006.01)

(52) U.S. Cl. .............................. 585/241; 210/748; 241/1

(58) Field of Classification Search ................ 210/748; 241/1; 585/241
See application file for complete search history.

(56) References Cited

U.S. PATENT DOCUMENTS 3,537,655 A * 11/1970 Gustafson .................... 210/748
4,732,331 A * 3/1988 Hughes ......................... 241/1

* cited by examiner

*Primary Examiner*—Glenn Caldarola
*Assistant Examiner*—Prem C. Singh
(74) *Attorney, Agent, or Firm*—Dekel Patent Ltd.; David Klein

(57) ABSTRACT

A method including mechanically breaking a source substance including relatively long carbon chains so as to produce a product comprising shorter chain carbon molecules.

35 Claims, No Drawings

FORMATION OF SUBSTANCES BY MECHANICAL BREAKING OF CARBON-CARBON CHAINS MOLECULES

FIELD OF THE INVENTION

The present invention relates generally to a novel process for the transformation of matter containing carbon chains into other substances, such as but not limited to, fuel.

BACKGROUND OF THE INVENTION

Carbon has the ability to form long chains that includes interconnecting carbon-carbon bonds. Carbon-carbon bonds are fairly strong. This property is important as it allows carbon to form a huge number of compounds. Non-limiting examples of such compounds are carbohydrates, hydrocarbons, alkanes, alkenes, saccharides, polysaccharides, natural polymers, synthesized polymers, synthetic polymers, fossil fuel, alcohols, complex alcohols, poly alcohols, natural rubbers, synthetic rubbers, fauna, flora, cellulose, lignin, starch, and others.

Through chemical-geological processes, organic matter may be transformed into fossil fuel. Through chemical processes the petrochemical industry may refine fossil fuel into many fractions, such as but not limited to, gases, liquids, and various viscous and solid products.

Non-limiting examples of such gases include natural gas, petroleum gas, alkanes of up to 5 carbons, alkenes of up to 5 carbons, methane, methanol, ethane, ethylene, propane, propylene, butane, butylene, pentane, pentene, etc. Non-limiting examples of such liquids include naphtha, gasoline, petrol, fuel oil, alkanes of 6 or more carbons, alkenes of 6 or more carbons, alcohols of 2 or more carbons, etc. Non-limiting examples of such viscous liquids include heavy fuel oil, wax distillates, base oils, alkanes of 16 or more carbons, alkenes of 16 or more carbons, alcohols of 16 or more carbons, etc. Non-limiting examples of such solids include wax distillates, waxes, bitumen, alkanes of 25 or more carbons, alkenes of 25 or more carbons, alcohols of 25 or more carbons, etc.

Through many chemical processes, with or without catalysts, the petrochemical industry may convert refined products into numerous derivative products.

Non-limiting examples for such chemical processes comprise precipitation, extraction, cracking, cross-linking, polymerization, Fisher-Tropsch, and more. Non-limiting examples of such derivative products comprise polymers, e.g., polyethylene, polypropylene, polyvinylchloride, polystyrene, polycarbonate, polyacrylate, synthetic rubber, SBS, SBR, paraffin wax, lubricants, and others.

Through other chemical processes, such as but not limited to, "fermentation", polysaccharides contained in flora and fauna may be turned into alcoholic fuels, such as but not limited to, methanol, ethanol, propanol, butanol, etc., or a mixture thereof. Through yet other chemical processes, such as but not limited to, "transesterification", flora and fauna oil may be turned into "bio-diesel", e.g., forms of fuel for such common uses as in diesel engines, heating and others.

Due to diminishing sources of fossil fuel and rising energy prices, there is a need for a technology enabling a renewable fuel source.

SUMMARY OF THE INVENTION

The present invention seeks to provide novel methods for transforming matter containing carbon chains into other substances, such as but not limited to, fuel, as is described more in detail hereinbelow. Many substances comprising relatively long carbon chain molecules may be mechanically broken and transformed into matter comprising shorter carbon chains. The terminology "mechanically broken" as used throughout the specification and claims refers to the application of physical force to a substance, which force causes the relatively long chain molecules to break into shorter chain molecules. The relatively long chain molecules may break into shorter chain molecules as a direct result of the physical force, and/or may break due to side effects caused by the application of the physical force (the term "side effects" refers to indirect effects that occur as a result of the application of the physical force, at or not at the same time). Non-limiting examples of side effects which result from the application of the physical force are chemical reactions or thermal energy (heating). Merely for the purposes of explanation, but without limiting the invention, it is possible that the mechanical breakage of relatively long carbon molecules by the application of physical force may create chemically unstable edges at the break point. These edges may give rise to chemical reactions (and possibly thermal and other reactions) to balance instability in the substance.

The terms mechanical breaking, physical breaking, mechanical molecule breaking, or physical molecule breaking are used interchangeably throughout.

Any material comprising fragments of carbon chains may be mechanically broken into individual fractions comprising shorter carbon chains, which may be used as fuel or as a source material for other processes.

There is thus provided in accordance with an embodiment of the present invention a method for mechanically transforming a first substance (also called "source") containing carbon chains (for example, a hydrocarbon, carbohydrate, polymer, wood, etc. or any combination thereof) by mechanically breaking its carbon chain molecules through the application of physical force to the first substance, to obtain a second substance (also called "product") that contains carbon chain molecules of shorter length than the first substance (for example, a fuel or a fuel comprising other matter, and many others).

There is provided in accordance with an embodiment of the present invention a method including mechanically breaking a source substance including relatively long carbon chains so as to produce a product substance including shorter chain carbon molecules.

The mechanically breaking may include at least one of milling, crushing, comminuting, wearing, tearing, crumbling, squeezing, pulverizing, grinding, impacting, breaking, applying ultra-sonic waves, voltage altering, and cold plasma milling.

The relatively long carbon chain molecules may be broken into shorter carbon chain molecules as a direct result of physical force of mechanical breaking. The relatively long carbon chain molecules may be broken into shorter carbon chain molecules due to side effects caused by application of physical cal forces of mechanical breaking. The side effects may include at least one of a chemical effect and a thermal effect.

In accordance with an embodiment of the present invention breaking the relatively long carbon chain molecules into the shorter chain carbon molecules may be carried out at temperatures at or below 100° C., at or below 50° C., at ambient temperature, at or below 0° C., at or below −50° C., at or below −100° C., or alternatively at or below −150° C.

Breaking the relatively long carbon chain molecules into the shorter chain molecules may be carried out at temperatures at or below the melting temperature of the source substance, at or below the glass transition temperature of the source substance, or at or below the melting temperature of the product substance.

Breaking the relatively long carbon chain molecules into the shorter chain carbon molecules may be carried out in a non-liquid environment or in a liquid environment. The non-liquid environment may include at least one of air, $CO_2$, $N_2$, $O_2$, $H_2$, $H_2O$ and He or a mixture thereof. The pressure of the non-liquid environment may be at or below atmospheric pressure, or alternatively at or above atmospheric pressure.

The liquid environment and the product substance may be immiscible. Alternatively, the liquid environment and the product substance may be miscible. The liquid environment may include the product substance.

In accordance with an embodiment of the present invention the mechanical breaking may include reducing at least some of the source substances including carbon chains into particles smaller than 1000 nanometers, smaller than 100 nanometers, smaller than 10 nanometers, or smaller than 1 nanometer. (Non-limiting examples of the above are size reductions of at least 1% of the source substance, alternatively at least 10% of the source substance, alternatively at least 30% of the source substance, alternatively at least 50% of the source substance, or alternatively at least 70% of the source substance.) In accordance with an embodiment of the present invention at least 0.2%, 2%, 10% or 20% of the source substance may transform into a product of carbon number (the number of carbon atoms in a molecule) lower than 50, alternatively carbon number lower than 150, alternatively carbon number lower than 500, or alternatively carbon number lower than 1000.

There is also provided in accordance with an embodiment of the present invention an article including a product produced by mechanically breaking relatively long carbon chains of a source substance into shorter chain carbon molecules.

The product may include carbon chains shorter than carbon number 1000, shorter than carbon number 500, shorter than carbon number 150, or shorter than carbon number 50. At least 0.2%, 2%, 10%, or 20% of the shorter chain carbon molecules included in the product may be of carbon number lower than 50, alternatively carbon number lower than 150, alternatively carbon number lower than 500, or alternatively carbon number lower than 1000.

DETAILED DESCRIPTION OF EMBODIMENTS

The novel process of the present invention may transform any source substance that includes relatively long carbon chains into a product substance that includes relatively short carbon chains. The process may transform the substance with the relatively long carbon chains into usable fuel, thus turning heretofore unthinkable sources of energy into viable and renewable energy sources.

Carbon has the ability of catenation, i.e., the ability to form long chains with interconnecting carbon-carbon bonds. Carbon-carbon bonds are fairly strong and relatively stable. This property allows carbon to form a huge number of compounds. One non-limiting example of a molecule with carbon chains is the hydrocarbon—a large family of organic molecules composed of hydrogen atoms bonded to a chain of carbon atoms. Chain length, side chains/branches, rings within the chain, substitutions and functional groups all affect the properties of these molecules.

Another non-limiting example of a molecule with carbon chains is carbohydrate, a large family of organic molecules made of carbon, hydrogen and oxygen atoms comprising a chain. Chain length, side chains/branches, rings within the chain, substitutions and functional groups all affect the properties of these molecules.

Thus, carbon chains are included in numerous molecules (materials) comprising mainly carbon, hydrogen and oxygen atoms, combined into linear chains, branched chains, rings, and many other formations. The number of carbon atoms (also referred to as "carbon number") in a molecule may vary from one (e.g., methane, methanol, etc.) to millions (e.g., polymers, starches, etc.).

Long carbon chains may form complex structures in which molecules are intertwined and entangled. Since fuels are made of relatively short carbon chains, mechanical breaking of long carbon chains to fractions may produce usable fuels.

It was surprisingly found that mechanically breaking (non-limiting examples include comminuting, milling, crushing, rubbing grinding, etc.) source substances containing relatively long carbon chains to particles smaller than 1 micron (1000 nanometers), preferably smaller than 100 nanometers, more preferably smaller than 10 nanometers, optionally smaller than 1 nanometer, results in the production of a substance comprising a variety of shorter-length carbon chains. Moreover, it was found that compared to the source substances, these product substances have a higher content of fractions (e.g., carbon chains of different lengths) that may be suitable for use as fuel. These fuel-like fractions may be separated from the untransformed and/or partially transformed substances by any available means. These fuel-like fractions may also be subjected to further refining, separation and/or upgrading processes, depending on the commercial need or application.

By increasing the fineness of the comminuting, the amount of broken molecule fragments is increased, thus creating more molecules of shorter carbon length nature. The mechanical breaking process may be done repeatedly, wherein the resultant product molecules may be further broken into shorter carbon chain molecules over and over again.

Any additional fragmentation of product molecules may be carried out. For example, a variety of molecules that were mechanically broken into molecules of carbon number lower than about 25 may form a mixture similar to liquid fuels. The mixture may be later further refined, upgraded and/or handled by other known procedures and equipment used for liquid fuels. A variety of molecules that were mechanically broken into molecules of carbon number lower than about 50 may form a mixture similar to viscous liquid fuels. A variety of molecules that were mechanically broken into molecules of carbon number lower than about 100 may form a mixture similar to crude oil. A variety of molecules that were mechanically broken into molecules of carbon number lower than about 150 may form a mixture similar to heavy crude oil. A variety of molecules that were mechanically broken into molecules of carbon number lower than about 500 may form a mixture similar to heavy oil sands or bituminous rocks. A variety of molecules that were mechanically broken into molecules of carbon number lower than about 1000 may form a mixture similar to asphaltenes. All the above mixtures may be later further refined, handled and/or upgraded by other procedures and equipment The term mechanically breaking encompasses any method for reducing particle size of source substances to sub-micron size by physical force, such as but not limited to, milling, crushing, comminuting, wearing, tearing, crumbling, squashing, pulverizing, crumbling, grinding, impacting, breaking, ultra-sonic waves applying, voltage altering, cold plasma milling, etc., or any combination thereof. Any means of mechanical molecule breaking capable of diminishing the size of the source material into particles smaller than 1000 nm are applicable to the process, such as but not limited to, ball mill, hammer mill, colloid mill, impact mill, grinders, crushers, vibratory mill, ultrasound mill, ultrasonic mill, jet mill, cryogenic mill, beads mill, splitters, cleavers, mincers, mashers, pounders, shredders, devices that diminish particle size by rubbing, squeezing, wear, abrasion, erosion, explosion, cold plasma milling, and others or any combination thereof.

Mechanical molecular breaking according to the present invention may be performed at temperatures where the source is in solid state, at temperatures where the source is below its glass transition temperature, or at temperatures where the product is in solid state. These conditions may vary according to various sources and may be at temperatures lower than 100° C., alternatively at temperatures lower than 50° C., alternatively at ambient temperature, alternatively at temperatures lower than 0° C., alternatively at temperatures lower than −50° C., alternatively at temperatures lower than −100° C., or alternatively at temperatures lower than −150° C.

Mechanical molecular breaking according to the present invention may be performed by dispersing or dissolving the source substance in a liquid, cooling said mixture of source and liquid below its freezing temperature, and mechanically breaking the solid mixture of frozen source and liquid to minute particles comprising product substances. Merely for the purposes of explanation, but without limiting the invention, it is possible that long complex source molecules may be intertwined and/or entangled between the liquid's frozen molecules making them susceptible to physical molecule breaking. Non-limiting examples for such liquids are water, fuel, alcohol, cyclohexane, etc.

Mechanical molecular breaking may be carried out in a gas environment (such as but not limited to, air, $CO_2$, $N_2$, $O_2$, $H_2$, $H_2O$, He, or a mixture thereof) at a pressure at, above or below atmospheric pressure, or in a liquid environment (such as but not limited to, a liquid immiscible with the product, a liquid miscible with the product, fuel, solvent, or a mixture thereof).

Non-limiting examples of liquid environments are:

a. Immiscible liquid—the final product (which may be fuel) does not dissolve in the surrounding liquid.

b. Miscible liquid—the source substance is ground and the resultant substance (which may be fuel) dissolves in the surrounding liquid.

c. Miscible dispersion—similar to the miscible liquid, except that particles just above liquid size stay as a stable dispersion in the surrounding liquid.

It was surprisingly found that the present invention has succeeded in physically breaking various source molecules into different smaller molecules.

Any material comprising carbon chains may be mechanically broken to a material comprising shorter carbon chains. Non-limiting examples of such sources are:

a. Organic matter b. Synthetic matter c. Polymer recycling d. Refinery residues (vacuum bottom, bitumen, feeds to catalytic cracking)—an alternative to catalytic cracking e. Polysaccharides (or carbohydrates, the terms may be used interchangeably), such as but not limited to, cellulose, lignin, dextrin, starch, glycogen, fat, amylose, amylopectin, wood f. Saturated hydrocarbons, natural, synthesized or synthetic, such as but not limited to, wax, oil, g. Saturated polymers, natural, synthesized or synthetic, such as but not limited to, polyolefines, etc.

h. Unsaturated hydrocarbons natural, synthesized or synthetic, such as but not limited to, natural rubber, synthetic rubber, vulcanized rubber, aromatic comprising hydrocarbons (e.g., polystyrene, latex)

i. Natural, synthesized or synthetic Polymers—such as but not limited to, natural rubber, synthetic rubber, sulphurized rubber, etc.

j. Domestic wastes k. Livestock waste/surplus l. Agricultural waste/surplus m. Any mixture comprising at least two of the above or one of the above with other substances.

The novel process may be better understood by the following non-limiting examples:

A standard kit for Gas Chromatography (GC) according to ASTM D-5442 C16-C44 qualitative retention time mix was purchased from Sigma-Aldrich Company and diluted in Cyclohexane to produce a "reference solution" comprising 416 ppm of each ingredient. The standard kit includes equal weight quantities of linear carbohydrates of carbon numbers 16, 18, 20, 22, 24, 26, 28, 30, 32, 36, 40, 44, which are used for GC calibration.

1 micro liter of the solution was injected to GC (Gas Chromatograph test according to ASTM D-5442 standard) to produce reference readings for qualitative and quantitative measurements for the following examples. The same reference solution was used to calibrate the GC tests on all the examples. In all the examples GC test was done according to ASTM D-5442 standard.

EXAMPLE 1:

1 milliliter of reference solution was poured over 100 grams of 2 mm diameter glass beads in a 400 milliliter tilted drum ball mill (the glass beads are the balls that physically break the molecules in the mill's closed drum). The moistened (reference solution coated) glass beads filled the bottom of the mill to an extent of about 10% of the drum's volume. The drum of the ball mill was cooled to about −150° C., and rotated at 60 Hz for 12 hours. At that temperature the solution's ambient liquid coat froze to solid form. The rotation of the drum created multiples impacts between the glass beads and the drum and between the beads themselves. These impacts caused mechanical breakage and hence a reduction of chain size of a substantial part of the molecules of the reference solution.

GC tests conducted on the milled solution in comparison to the un-milled solution show that the impacts broke at least about 40% of the molecules of the reference solution to different shorter molecules. The impact formed molecules of carbon numbers 7, 12, 19, 21, 23, and 27 that did not exist in the source substance.

EXAMPLE 2:

"Montan Wax" ("Romonta N" of Romonta, Germany, mostly linear saturated hydrocarbon of about 100 carbons in a molecule,) was milled in an oscillatory ball mill according to the following:

Powdered Montan wax and 50 grams of 2 mm diameter glass beads were put into the mill's 100 milliliter metallic cylinder (the glass beads are the grinding balls). Glass beads and Montan powder filled about half of the cylinder's volume. The mill was operated at 8 cm amplitude at 10 Hz at various durations and temperatures as detailed below. The oscillation of the drum created multiples impacts between the glass beads and the drum and between themselves. These impacts caused mechanical breakage and hence a reduction of chain size of a substantial part of the molecules of the Montan wax.

15 grams of Montan wax were milled with 50 grams of 2 mm diameter glass beads for 3 hours at −50° C.

Another 15 grams of powdered Montan wax were milled with 50 grams of 2 mm diameter glass beads for 12 hours at −50° C.

Montan free flowing powder entering the physical molecule breaking process was broken and transformed into a softer continuous coating on the glass beads and the cylinder's surface.

The milled Montan Wax was subjected to TH (Total Hydrocarbon) and TPH (Total Petroleum Hydrocarbon) tests according to U.S. EPA 418.1 test method (a test method for petroleum hydrocarbons) using FTIR (Fourier Transform Infra-Red) instrument. The milled Montan wax was also subjected to GC test.

TH and TPH results obtained from FTIR tests are listed in the following table 1.

TABLE 1

| Sample | TH*, ppm, (% weight) | TPH** ppm (% weight) |
| --- | --- | --- |
| Glass grinding beads*** | Undetectable | Undetectable |
| Untreated Montan | 44,500 (4.5%) | 12,670 (1.3%) |
| 3 hours milled Montan at −50° C. | 260,230 (26.0%) | 59,730 (6.0%) |
| 12 hours milled Montan at −50° C. | 490,330 (49.0%) | 117,400 (11.7%) |

*Total Hydrocarbons, including hydrocarbons derived from diverse sources (fats, etc).
**Total Petroleum Hydrocarbons (hydrocarbons derived from petroleum products only).
***Glass beads were tested for TH and TPH as reference to ensure no external hydrocarbon contamination.

Untreated Montan wax contains mostly molecules whose approximate carbon numbers are too high to be detected in the test. The FTIR results of untreated Montan show that only 4.5% by weight are hydrocarbons molecules detectable by the TH test, of which only 1.3% are petroleum molecules that are detectable by the TPH test.

3 hours milling of Montan wax at −50° C. broke substantial parts of the molecules of the original Montan wax, increasing the quantity of small molecules by a magnitude of 5 (4.5% turned into 26% of shorter hydrocarbon molecules being able to be detected by the TH test, of which 6% comply with the definition of petroleum molecules detectable by the TPH test). Further milling of Montan wax for a total of 12 hours at −50° C. broke nearly 50% of the original molecules (4.5% turned after milling into 49%), turning them into shorter hydrocarbon molecules detectable by the TH test, of which 11.7% comply with the definition of petroleum molecules detectable by the TPH test.

Results of the gas chromatography (GC) tests show the following:

Compared to un-milled, the milled Montan shows new existence of carbon numbers 19-21 and 34-74 of both diverse and petroleum nature. Milled Montan also shows a substantially larger diversity and quantity of constituents of carbon numbers 22-33.

EXAMPLE 3:

"Low density polyethylene" (LDPE, Ipethene 323 of Carmel Olefins, M.F.R—2.0) was ground in a ball mill as in example 2 above. 4 grams of powdered LDPE were milled with 50 grams of 2 mm diameter glass beads for 12 hours at ambient temperatures. Another 4 grams of powdered LDPE were milled with 50 grams of 2 mm diameter glass beads for 8 hours at −50° C. LDPE free flowing powder entering the milling was transformed into a wax-like coating on the glass beads and cylinder's surface. The milled LDPE was subjected to TH and TPH tests according to EPA 418.1 standard as described in example 2 above:

TH and TPH results obtained from FTIR tests are listed in the following table 2.

TABLE 2

| Sample | TH*, ppm, (% weight) | TPH**, ppm, (% weight) |
| --- | --- | --- |
| Glass grinding beads*** | Undetectable | Undetectable |
| Untreated LDPE | 7,500 (0.75%) | 6,346 (0.63%) |
| 12 hours ambient milled LDPE | 10,300 (1.03%) | 7,440 (0.74%) |
| 8 hours milled LDPE at −50° C. | 9,200 (0.92%) | 7,400 (0.74%) |

*Total hydrocarbons, including hydrocarbons derived from diverse source (fats, etc).
**Total Petroleum Hydrocarbons (hydrocarbons derived from petroleum products only).
***Glass beads were tested for TH and TPH as reference to ensure no external hydrocarbon contamination.

Untreated LDPE powder comprises mostly macromolecules of carbon number higher than 10,000. Only about 0.75% are molecules detectable in the TH test of which only 0.63% are petroleum molecules detectable by the TPH test.

The TH and TPH tests shows that milling LDPE broke parts of the macromolecules of the original polymer, reducing the quantity of long chain molecules and increasing the quantity of small molecules.

The results obtained show that LDPE is susceptible to physical molecular breakage. After 12 hours of milling at ambient temperature, the TH increased by 37% from 7500 ppm to 10300 ppm, and the TPH increased by 17% from 6346 ppm to 7440 ppm. After 8 hours of milling at −50° C., the TH increased by 22% from 7500 ppm to 9200 ppm and the TPH increased by 17% from 6346 ppm to 7400 ppm.

The milled LDPE was also subjected to gas chromatography (GC) tests. Compared to un-milled, the milled LDPE shows new existences of carbon numbers 8, 10, 12, 15, 18, 20, 21, 24, 25, 28, 30 and 31.

EXAMPLE 4:

Polypropylene homo polymer (PP, Capilene E63F of Carmel Olefins, M.F.R—1.9) was milled in an oscillatory ball mill as in example 2 above. 5 grams of powdered PP were milled with 50 grams of 2 mm diameter glass beads for 2 hours at −150° C. The milled PP was subjected to gas chromatography (GC) tests and compared to untreated PP.

Untreated PP powder comprises mostly macromolecules of carbon number higher than 10,000. Only about 0.5% are molecules detectable in GC tests.

Compared to un-milled, the milled PP shows new existence of molecules with carbon numbers 20 and 25. The appearance of these carbon numbers correspond to about 20.5% of the molecules detected in this test.

EXAMPLE 5:

Wheat flour was milled in an oscillatory ball mill as in example 2 above:

10 grams of wheat flour were milled with 50 grams of 2 mm diameter glass beads for 12 hours at −50° C. Free flowing wheat flour entering the mechanical molecule breaking process was milled and transformed into a coating on the glass beads and cylinder's surface. The milled flour was subjected to gas chromatography (GC) tests. Untreated wheat flour powder comprises mostly starch, macromolecules of polysaccharides of carbon number higher than 10,000. Only about 0.8% are molecules detectable in GC tests. Compared to un-milled, the milled wheat flour shows new existence of molecules with carbon numbers 8, 10, 25 and 32. The appearance of these carbon numbers correspond to about 45.5% of the molecules detected in this test.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method comprising:
mechanically breaking a source substance comprising relatively long carbon chains molecules by application of physical force to said source substance, which force causes the relatively long chain molecules to break into shorter chain molecules so as to produce a product substance comprising shorter chain carbon molecules, wherein breaking the relatively long carbon chain molecules into the shorter chain carbon molecules is carried out at temperatures at or below 0° C., wherein said shorter chain carbon molecules include fuel fractions, and further comprising recovering said fuel fractions from said product substance.

2. The method according to claim 1, wherein breaking the relatively long carbon chain molecules into the shorter chain carbon molecules is carried out at temperatures at or below −50° C.

3. The method according to claim 1 wherein breaking the relatively long carbon chain molecules into the shorter chain carbon molecules is carried out at temperatures at or below −100° C.

4. The method according to claim 1, wherein breaking the relatively long carbon chain molecules into the shorter chain carbon molecules is carried out at temperatures at or below −150° C.

5. The method according to claim 1, wherein breaking the relatively long carbon chain molecules into the shorter chain molecules is carried out at temperatures at or below the melting temperature of the source substance.

6. The method according to claim 1, wherein breaking the relatively long carbon chain molecules into the shorter chain molecules is carried out at temperatures at or below the glass transition temperature of the source substance.

7. The method according to claim 1, wherein breaking the relatively long carbon chain molecules into the shorter chain molecules is carried out at temperatures at or below the melting temperature of the product substance.

8. The method according to claim 1, wherein breaking the relatively long carbon chain molecules into the shorter chain carbon molecules is carried out in a non-liquid environment.

9. The method according to claim 1, wherein breaking the relatively long carbon chain molecules into the shorter chain carbon molecules is carried out in a liquid environment.

10. The method according to claim 8 wherein the non-liquid environment comprises at least one of air, $CO_2$, $N_2$, $O_2$, $H_2O$, and He.

11. The method according to claim 8 wherein the pressure of the non-liquid environment is at or below atmospheric pressure.

12. The method according to claim 8, wherein the pressure of the non-liquid environment is at or above atmospheric pressure.

13. The method according to claim 9, wherein said liquid environment and said product substance are immiscible.

14. The method according to claim 9 wherein said liquid environment and said product substance are miscible.

15. The method according to claim 9, wherein said liquid environment comprises said product substance.

16. The method according to claim 1, wherein the mechanical breaking comprises reducing at least some of the source substances comprising carbon chains into particles smaller than 1000 nanometers.

17. The method according to claim 1, wherein the mechanical breaking comprises reducing at least some of the source substances comprising carbon chains into particles smaller than 100 nanometers.

18. The method according to claim 1, wherein the mechanical breaking comprises reducing at least some of the source substances comprising carbon chains into particles smaller than 10 nanometers.

19. The method according to claim 1, wherein the mechanical breaking comprises reducing at least some of the source substances comprising carbon chains into particles smaller than 1 nanometer.

20. The method according to claim 1, wherein at least 0.2% of the source substance transforms into a product of carbon number lower than 50.

21. The method according to claim 1, wherein at least 2% of the source substance transforms into a product of carbon number lower than 50.

22. The method according to claim 1, wherein at least 10% of the source substance transforms into a product of carbon number lower than 50.

23. The method according to claim 1, wherein at least 20% of the source substance transforms into a product of carbon number lower than 50.

24. The method according to claim 1, wherein at least 0.2% of the source substance transforms into a product of carbon number lower than 100.

25. The method according to claim 1, wherein at least 2% of the source substance transforms into a product of carbon number lower than 100.

26. The method according to claim 1, wherein at least 10% of the source substance transforms into a product of carbon number lower than 100.

27. The method according to claim 1, wherein at least 20% of the source substance transforms into a product of carbon number lower than 100.

28. The method according to claim 1, wherein at least 0.2% of the source substance transforms into a product of carbon number lower than 150.

29. The method according to claim 1, wherein at least 2% of the source substance transforms into a product of carbon number lower than 150.

30. The method according to claim 1, wherein at least 10% of the source substance transforms into a product of carbon number lower than 150.

31. The method according to claim 1, wherein at least 20% of the source substance transforms into a product of carbon number lower than 150.

32. The method according to claim 1, wherein at least 0.2% of the source substance transforms into a product of carbon number lower than 500.

33. The method according to claim 1, wherein at least 2% of the source substance transforms into a product of carbon number lower than 500.

34. The method according to claim 1, wherein at least 10% of the source substance transforms into a product of carbon number lower than 500.

35. The method according to claim 1, wherein at least 20% of the source substance transforms into a product of carbon number lower than 500.

* * * * *